(12) United States Patent
Kobal

(10) Patent No.: US 7,529,678 B2
(45) Date of Patent: May 5, 2009

(54) USING A SPOKEN UTTERANCE FOR DISAMBIGUATION OF SPELLING INPUTS INTO A SPEECH RECOGNITION SYSTEM

(75) Inventor: Jeffrey S. Kobal, Lake Worth, FL (US)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 11/093,544

(22) Filed: Mar. 30, 2005

(65) Prior Publication Data

US 2006/0229870 A1  Oct. 12, 2006

(51) Int. Cl.
*G10L 21/00* (2006.01)

(52) U.S. Cl. ....................................... 704/275

(58) Field of Classification Search .......... 704/251–254
See application file for complete search history.

(56) References Cited

U.S. PATENT DOCUMENTS 5,842,163 A * 11/1998 Weintraub ................. 704/240
5,917,889 A    6/1999 Brotman et al.
5,995,928 A   11/1999 Nguyen et al.
6,076,053 A *  6/2000 Juang et al. ................. 704/236
6,374,220 B1 *  4/2002 Kao ........................... 704/255
6,980,954 B1 * 12/2005 Zhao et al. .................. 704/251
6,985,861 B2 *  1/2006 Van Thong et al. ......... 704/254
7,149,970 B1 * 12/2006 Pratley et al. ............... 715/257

FOREIGN PATENT DOCUMENTS

EP     1122636 A2    8/2001

* cited by examiner

*Primary Examiner*—Michael N Opsasnick
(74) *Attorney, Agent, or Firm*—Cuenot & Forsythe, L.L.C.

(57) ABSTRACT

A method of verifying a speech input can include determining pronunciation data for a received user spoken utterance specifying a word and speech recognizing further user spoken utterances specifying individual characters of the word. An N-best list can be generated for each received user spoken utterance specifying a character. A grammar can be automatically generated that includes word candidates using the N-best list for each user spoken utterance specifying a character. Pronunciation data for each word in the grammar can be generated automatically. The pronunciation data from the user spoken utterance specifying the word can be compared with pronunciation data for the word candidates of the grammar to determine at least one match.

3 Claims, 2 Drawing Sheets

USING A SPOKEN UTTERANCE FOR DISAMBIGUATION OF SPELLING INPUTS INTO A SPEECH RECOGNITION SYSTEM

BACKGROUND

1. Field of the Invention

The present invention relates to speech recognition systems and, more particularly, to disambiguating speech inputs provided to such a system.

2. Description of the Related Art

Speech recognition refers to the ability of a machine or program to convert user speech into a textual representation or string that can be easily manipulated by a computer. Once speech has been so converted, the information can be used in a variety of different ways. For example, speech recognition technology allows computers to respond to user speech commands in the context of command and control. In another example, speech recognition technology enables computers to take dictation.

Generally, a speech recognition system (SRS) performs an acoustic analysis upon a received speech input. Information relating to the pronunciation of the speech input is generated. This data, which provides a phonetic representation of the speech input, then can be compared with a vocabulary of recognizable words or a set of defined grammars to determine a match. A statistical language model also can be used to aid in the recognition process. The statistical language model provides context within which a potential recognition result can be evaluated. That is, given a string of one or more words derived from a user spoken utterance, a statistical model can provide an indication, within a statistical certainty, as to what the next word of the string will be.

SRSs have achieved acceptable levels of accuracy with respect to recognition of phrases comprising a plurality of words. When phrases of words are evaluated, the constituent words usually are acoustically dissimilar and, thus, can be differentiated from one another. The use of a language model provides an additional means of disambiguating one word from another. In other cases, however, such as when recognizing individual words, and particularly proper nouns or individual characters, speech recognition tends to be less accurate. One reason for this is that generating a grammar of all difficult to recognize words, such as names, is very difficult, if not impossible. Also, when recognizing individual words, contextual models provide no additional insight.

One proposed solution for recognizing these more difficult words has been to ask users to spell the word being provided as input. The user is asked to speak each letter or character of the intended word. Letter input, however, can be ambiguous due to the brevity of the utterance and the acoustic confusability of the letters. In English, for example, it is difficult to distinguish between the letters F and S. Other confusingly similar characters can include B, C, D, E, G, P, T, V, and Z. Further, similar to when recognizing individual words, language models do not provide additional information for disambiguating individual letters.

In consequence, it becomes necessary to disambiguate the spelling input using other means. Typically, disambiguation is performed using a combination of N-best matching and querying of the user. The user is asked by the SRS whether a potential recognition result for each spoken letter is correct. For example, for each recognized letter, the user can be queried as follows: "Did you say E?", "Did you say B?", "Did you say D?", etc., continuing down the N-best list of commonly confused letters associated with the potential recognition result until the user responds affirmatively. This continues until the entire word is spelled and recognized.

This method of letter-by-letter, question-answer style disambiguation can be very tedious and time consuming for users. It would be beneficial to have a technique for recognizing and/or verifying word input in a manner which overcomes the deficiencies described above.

SUMMARY OF THE INVENTION

The present invention provides a solution for recognizing and/or verifying word input. One embodiment of the present invention can include a method of verifying a speech input. The method can include determining pronunciation data for a received user spoken utterance specifying a word and speech recognizing further user spoken utterances specifying individual characters of the word. An N-best list including N-best character matches can be generated for each received user spoken utterance specifying a character. Each N-best list can be associated with one of the user spoken utterances specifying a character. A grammer can be automatically generated that includes word candidates using the N-best list for each character. Each word of the grammer can be formed using a letter selected from each N-best list in an order corresponding to an order in which each user spoken utterance specifying a character, and being associated with an N-best list, is received. The method also can include automatically generating pronunciation data for each word in the grammar. The pronunciation data from the user spoken utterance specifying the word can be compared with the pronunciation data for the word candidates of the grammar to determine at least one match.

Another embodiment of the present invention can include a method of processing a speech input including selecting a domain of words and determining pronunciation data for a word specified by a received user spoken utterance. The method also can include comparing the pronunciation data for the word with a list of common words of the domain to find a match. When a match is found, further speech processing can be discontinued. When a match is not found, further user spoken utterances specifying a plurality of individual characters of the word can be recognized for comparison to the recognition result. In that case, the method can include generating an N-best list including N-best character matches for each received user spoken utterance specifying a character, wherein each N-best list is associated with one of the user spoken utterances specifying a character, and automatically generating a grammar including word candidates using the N-best list for each character, wherein each word of the grammar is formed using a letter selected from each N-best list in an order corresponding to an order in which each user spoken utterance specifying a character, and being associated with an N-best list, is received. Pronunciation data for each word in the grammar can be automatically generated. The pronunciation data from the user spoken utterance specifying the word can be compared with the pronunciation data for the word candidates of the grammar to determine at least one match.

Another embodiment of the present invention can include a machine readable storage being programmed to cause a machine to perform the various steps described herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

The present invention provides a solution for recognizing and disambiguating user speech inputs. In accordance with the inventive arrangements disclosed herein, the present invention can be used to recognize those words that traditionally are more difficult for speech recognition systems (SRSs) to recognize. Such words can include, but are not limited to, proper nouns including names, city names, and the like. The present invention determines pronunciation data for a user speech input specifying a word. Character-by-character speech input which spells the word, referred to as spelling type input, can be received and recognized. In general, the recognized characters from the spelling type input can be used to generate a grammar of word candidates. The grammar can be compared to the pronunciation data for the word for purposes of verification.

Figure 1:
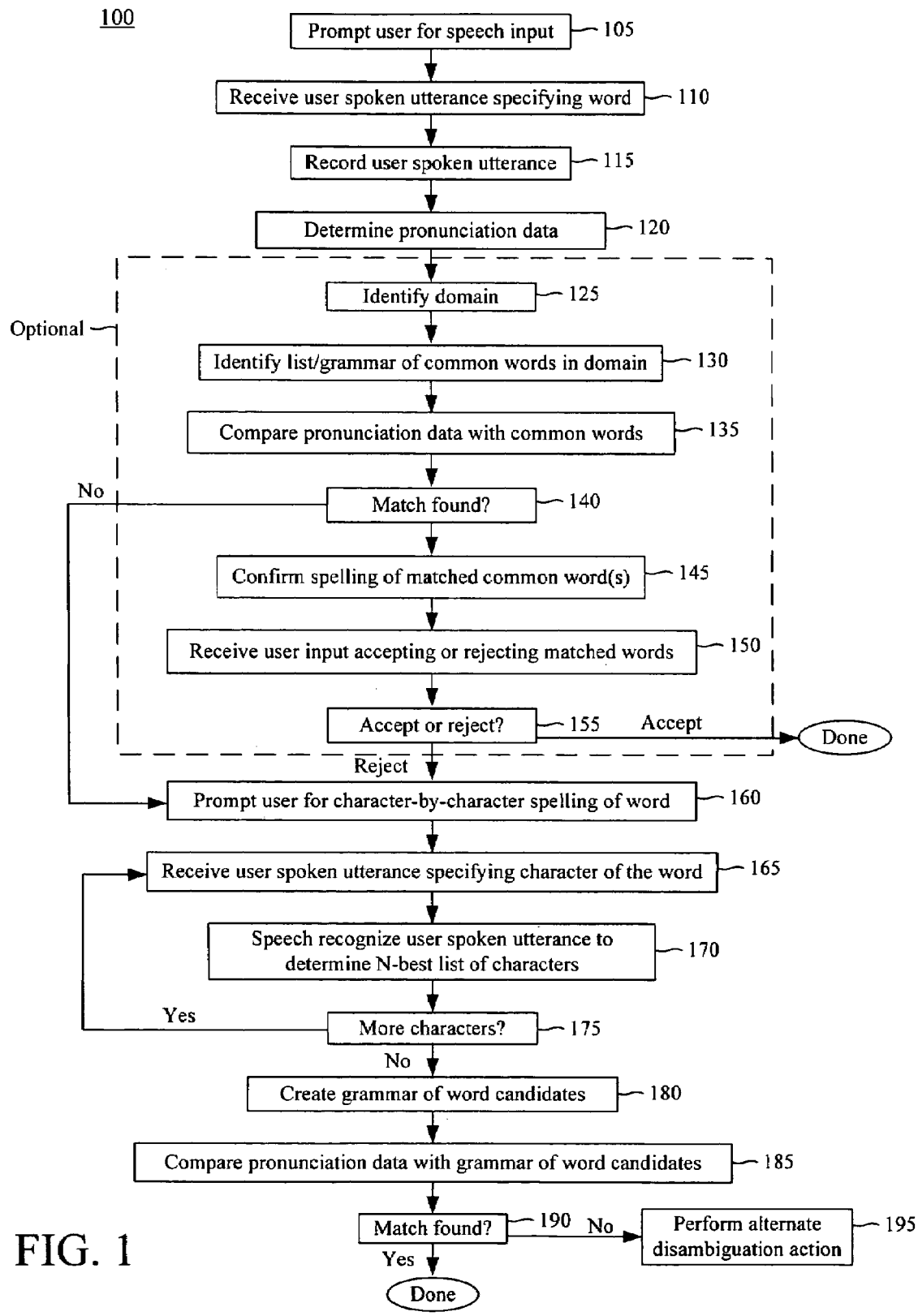
FIG. 1 is a flow chart illustrating a method of disambiguating user speech inputs in accordance with the inventive arrangements disclosed herein.

FIG. 1 is a flow chart illustrating a method 100 of disambiguating user speech inputs in accordance with the inventive arrangements disclosed herein. The method 100 can be performed by a SRS in the context of communicating with a user. In one embodiment, the SRS can be disposed within the user's computer system. For example, the computer system can be implemented as a desktop computer system, a laptop computer, a personal digital assistant, or the like. Any suitable computer system adapted for performing speech processing and having suitable audio input and output capabilities can be used. In another embodiment, the SRS can be remotely located, whether accessible via a data connection or a voice connection, such as when implemented in an interactive voice response (IVR) system.

It should be appreciated that the SRS can be coupled with a text-to-speech (TTS) system or other audio playback system. Use of such a system in cooperation with the SRS allows the user to be provided with audio prompts as discussed herein. Notwithstanding, in other arrangements, prompts can be provided through visual means such as text, for example in the case of a multimodal interface.

In step 105, the user can be asked to provide a word as speech input. In step 110, a user spoken utterance specifying a word can be received by the SRS. In step 115, the user spoken utterance can be recorded for further processing. In step 120, the user spoken utterance can be processed to determine pronunciation data. More particularly, within the process of speech recognition, the user spoken utterance can undergo an acoustic analysis. During this process, the SRS can generate pronunciation data for the user spoken utterance and/or a phonetic representation of the word specified by the user spoken utterance.

Steps 125-155 comprise an optional feature of the present invention which provides a fast alternative to recognizing a received word. In general, if the word specified by the user spoken utterance is recognized using this optional procedure, then further disambiguation and/or speech processing of the user input is not required. Accordingly, in step 125, the particular domain to which the user spoken utterance is expected to belong can be identified or selected.

The word specified by the user spoken utterance can belong to a particular class or domain of words. For example, the SRS may ask the user for the user's name, the city in which the user is located, a particular brand of product, etc. If the SRS is asking for the user's name, for instance, the domain can be comprised of first names or proper names as the case may be. If the SRS has asked for a city, the domain can be comprised of city names. The examples disclosed herein are provided for purposes of illustration only and, as such, are not intended to limit the scope of the present invention.

Accordingly, in step 130 a list of words common to the selected domain can be identified. More particularly, for each domain that is specified within the SRS system, a grammar of common words can be included. The list or grammar of common words can be determined through any of a variety of different techniques, such as statistically processing a corpus of text, analyzing user responses to specific questions over time, etc. Despite the manner in which the common words are determined, a grammar specifying such words which corresponds to the domain can be selected.

In step 135, the pronunciation data can be compared with the list of common words. As known, the SRS can include pronunciations for each of the common words. The pronunciations can be pre-programmed, generated by the SRS dynamically, or generated by the TTS dynamically and then provided to the SRS. Accordingly, the pronunciation data for the word can be compared with the pronunciation data for the list of common words.

In any case, in step 140, a determination can be made as to whether the pronunciation data matches any of the common words of the domain. If one or more matches are determined, the method can continue to step 145. If not, the method can proceed to step 160. In step 145, the spelling of the matched common word, or words, can be confirmed with the user. For instance, the SRS can provide a prompt which states, "Did you say Dave, spelled D-A-V-E?". In the prompt, the word can be pronounced and then spelled. If more than one word is matched, each can be presented to the user one-by-one, where each potential word is pronounced and spelled. Alternatively, if the SRS interacts with the user via a text-based prompt, the potential, or matched, word can be displayed as text. In either case, the SRS can prompt the user to verify or select a particular one of the matched common words.

In step 150, a user input can be received which either accepts one of the matched words or rejects the matched words. In step 155, a determination can be made as to whether the user input has accepted a matched word or rejected the matched word(s). If the user input accepts a matched word, the method can end as a match has been found. If the user input rejects the matched word, the method can proceed to step 160.

In step 160, the SRS can prompt the user for a character-by-character spelling of the word specified by the speech input in step 110. In step 165, a user spoken utterance can be received which specifies a character of the word. In step 170, the user spoken utterance can be speech recognized and the N-best matches for the received user spoken utterance can be determined. As noted, when receiving speech inputs specifying individual characters in the case of spelling a word, particular letters, numbers, or symbols may be easily confused by the SRS. If the user says the letter B, for example, the SRS may understand B, V, E, D, etc. Accordingly, the SRS can determine the most likely matches, or recognition results, for the received user spoken utterance. In this case, the N-best list will be restricted to confusable characters, i.e. letters, numbers, and/or symbols. Each character specified in the N-best list can be considered a character candidate. The character candidates can be ordered from the most likely to the least likely for each user spoken utterance.

In step 175, a determination can be made as to whether further user spoken utterances specifying characters are to be received. If so, the method can loop back to step 165 to receive and process further user spoken utterances. The method 100 can continue to loop until the user has finished spelling the word. When no further letters remain, the method can continue to step 180.

Figure 2:
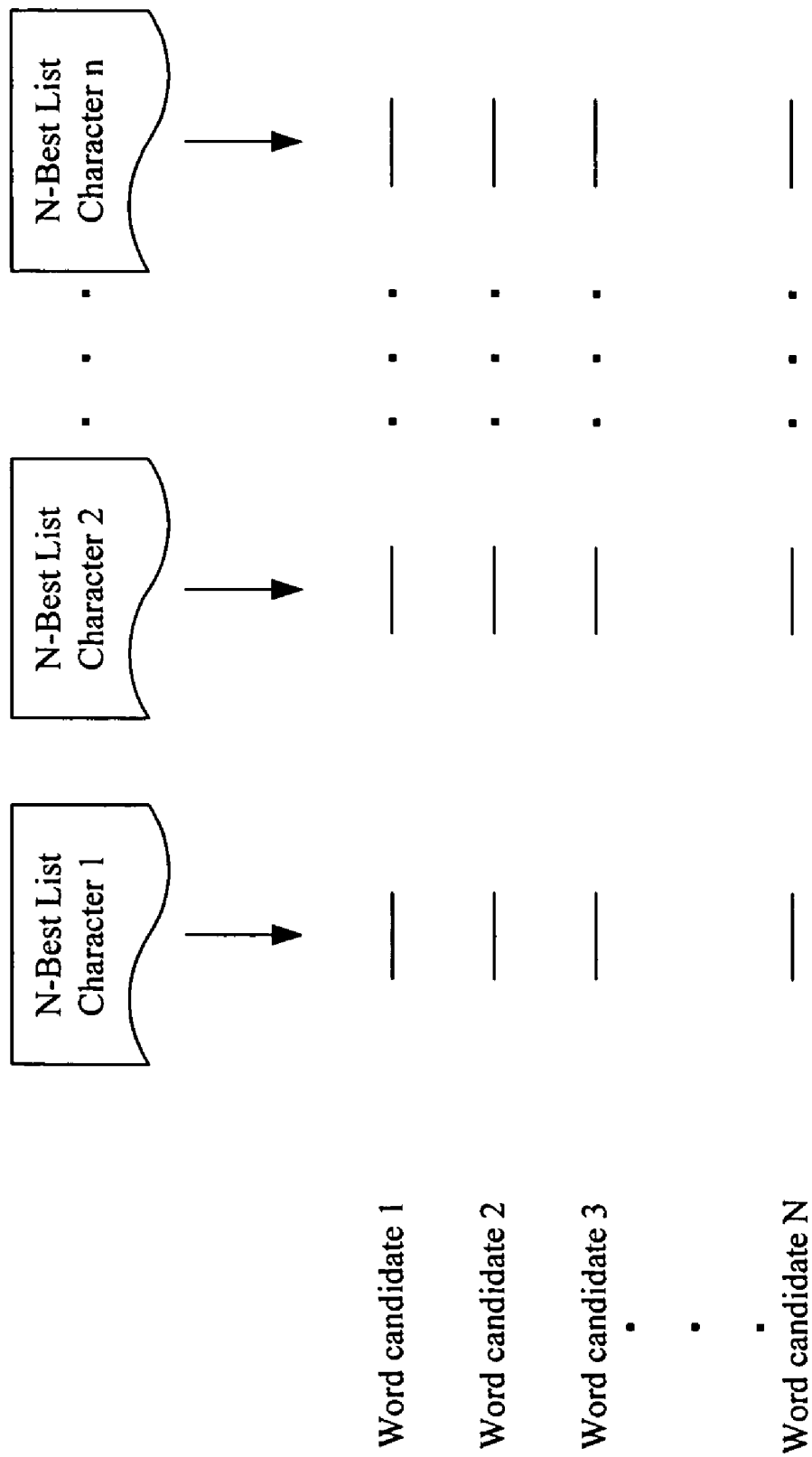
FIG. 2 is a schematic diagram illustrating a technique for generating word candidates using N-best lists in accordance with the inventive arrangements disclosed herein.

In step 180, a grammar can be generated automatically and dynamically by creating combinations of words using the character candidates specified in the N-best list for each recognized character of the word. When generating word candidates, the first character can be selected from the N-best list corresponding to the first recognized character, the second character can be selected from the N-best list corresponding to the second recognized character, etc. FIG. 2 is a schematic diagram illustrating a technique for generating word candidates using N-best lists as described herein.

According to one embodiment, word candidates can be generated without limitation of a dictionary defining allowable words. That is, the SRS can generate all possible character permutations (word candidates) from the N-best lists so long as the guidelines described with reference to step 180 are observed. This technique can result in pseudo words, or character combinations that are not actual words. In another embodiment, the character permutations can be restricted to those defined in a dictionary of allowable words. This ensures that only actual words or predetermined pseudo-words will be created.

In step 185, the pronunciation data of step 120 can be compared with the grammar of word candidates. In one arrangement, the SRS can be configured to generate pronunciation data for the word candidates in the grammar. The pronunciation data can be generated based upon the spellings of the word candidates. In another arrangement, the SRS can pass the word candidates to the TTS, which can generate pronunciation data for each word in the grammar based upon the spellings of the word candidate. If a match is found in step 190, then the method can end as the potential recognition result was verified against the word candidates. If no match is found, in step 195 an alternate disambiguation technique can be performed, for example conventional letter-by-letter disambiguation.

FIG. 2. is a schematic diagram illustrating a technique for generating word candidates using N-best list in accordance with the inventive arrangements disclosed herein.

The present invention provides a solution for disambiguating speech inputs to a SRS. In accordance with the inventive arrangements disclosed herein, a user spoken utterance specifying a word can be processed to determine pronunciation data for the utterance. Speech inputs which spell the word then can be provided to the SRS. A grammar of word candidates can be created dynamically and automatically by generating permutations from N-best lists obtained from speech recognizing each character of the word. The pronunciation data for the word then can be compared with the grammar of word candidates for purposes of verification. The present invention also provides a technique for quickly confirming whether a potential recognition result is accurate by comparing the recognition result with a grammar of domain-specific, common words.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which, when loaded in a computer system, is able to carry out these methods. Computer program, software application, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of verifying a speech input comprising:

determining pronunciation data for a received user spoken utterance specifying a word;

speech recognizing a plurality of further user spoken utterances specifying characters of the word, wherein each further user spoken utterance specifies one individual character of the word;

generating an N-best list, comprising N-best character matches, for each received further user spoken utterance specifying a character of the word, wherein each N-best list is associated with one of the user spoken utterances specifying a character and a number of the N-best lists generated corresponds to a number of characters in the word;

automatically generating a grammar comprising word candidates using the N-best list for each character, wherein each word of the grammar is formed using one letter selected from each N-best list existing at a same level of each respective N-best list and in an order corresponding to an order in which each user spoken utterance specifying a character, and being associated with an N-best list, is received;

automatically generating pronunciation data for each word in the grammar;

comparing the pronunciation data from the user spoken utterance specifying the word with the pronunciation data for the word candidates of the grammar to determine at least one match; and storing the match in memory as a recognition result for the word.

2. A computer-implemented method of processing a speech input comprising:

selecting a domain of words;

determining pronunciation data for a word specified by a received user spoken utterance;

comparing the pronunciation data for the word with a list of common words of the domain to find a match;

when a match is found, discontinuing further speech processing;

when a match is not found, speech recognizing a plurality of further user spoken utterances specifying characters of the word, wherein each of the plurality of further user spoken utterances specifies one individual character of the word for comparison to the pronunciation data, generating an N-best list comprising N-best character matches for each received user spoken utterance specifying a character and a number of N-best lists corresponding to a number of characters in the word are generated, wherein each N-best list is associated with one of the user spoken utterances specifying a character, automatically generating a grammar comprising word candidates using the N-best list for each character, wherein each word of the grammar is formed using one letter selected from each N-best list existing at a same level of each respective N-best list and in an order corresponding to an order in which each user spoken utterance specifying a character, and being associated with an N-best list, is received, automatically generating pronunciation data for each word in the grammar, and comparing the pronunciation data from the user spoken utterance specifying the word with the pronunciation data for the word candidates of the grammar to determine at least one match; and storing the match in memory as a recognition result for the word.

3. A machine readable storage, having stored thereon a computer program having a plurality of code sections executable by a machine for causing the machine to perform the steps of:

determining pronunciation data for a received user spoken utterance specifying a word;

speech recognizing a plurality of further user spoken utterances specifying characters of the word, wherein each further user spoken utterance specifies one individual character of the word;

generating an N-best list comprising N-best character matches for each received further user spoken utterance specifying a character of the word, wherein each N-best list is associated with one of the user spoken utterances specifying a character and a number of the N-best lists generated corresponds to a number of characters in the word;

automatically generating a grammar comprising word candidates using the N-best list for each character, wherein each word of the grammar is formed using one letter selected from each N-best list existing at a same level of each respective N-best list and in an order corresponding to an order in which each user spoken utterance specifying a character, and being associated with an N-best list, is received;

automatically generating pronunciation data for each word in the grammar; and comparing the pronunciation data from the user spoken utterance specifying the word with the pronunciation data for the word candidates of the grammar to determine at least one match.

* * * * *